(12) United States Patent
Seta et al.

(10) Patent No.: US 11,084,380 B2
(45) Date of Patent: Aug. 10, 2021

(54) POWER SUPPLY SYSTEM FOR A HYBRID VEHICLE

(71) Applicant: SUBARU CORPORATION, Tokyo (JP)

(72) Inventors: Itaru Seta, Tokyo (JP); Tatsuhiro Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 138 days.

(21) Appl. No.: 16/406,760

(22) Filed: May 8, 2019

(65) Prior Publication Data

US 2020/0016980 A1 Jan. 16, 2020

(30) Foreign Application Priority Data

Jul. 13, 2018 (JP) ............................. JP2018-132995

(51) Int. Cl.
| | |
|---|---|
| *B60L 3/00* | (2019.01) |
| *B60K 6/40* | (2007.10) |
| *B60K 6/28* | (2007.10) |
| *B60L 3/04* | (2006.01) |
| *H02P 27/06* | (2006.01) |

(52) U.S. Cl.
CPC ............. *B60L 3/0046* (2013.01); *B60K 6/28* (2013.01); *B60K 6/40* (2013.01); *B60L 3/04* (2013.01); *B60L 2210/10* (2013.01); *B60L 2240/545* (2013.01); *B60L 2240/547* (2013.01); *B60Y 2200/92* (2013.01); *H02P 27/06* (2013.01)

(58) Field of Classification Search
CPC ............ B60L 3/0046; B60K 6/28; B60K 6/40
USPC ................................................ 307/10.6, 10.7
See application file for complete search history.

(56) References Cited

U.S. PATENT DOCUMENTS

| | | | | |
|---|---|---|---|---|
| 6,037,749 A | * | 3/2000 | Parsonage | G01R 31/3648 320/132 |
| 6,229,279 B1 | * | 5/2001 | Dierker | F02N 11/0866 320/104 |
| 2004/0026140 A1 | * | 2/2004 | Suzuki | B60L 58/18 180/65.26 |

(Continued)

FOREIGN PATENT DOCUMENTS

| | | |
|---|---|---|
| JP | 2016-155439 A | 9/2016 |
| JP | 2018198519 A * | 12/2018 |

*Primary Examiner* — Adi Amrany
(74) *Attorney, Agent, or Firm* — McDermott Will & Emery LLP

(57) ABSTRACT

A power supply system including: a driving motor capable of outputting power for driving a driving wheel; a main battery that stores electricity to be supplied to the driving motor; an engine capable of outputting power for driving the driving wheel; a starter motor that starts the engine; an auxiliary battery that stores electricity to be supplied to the starter motor and auxiliaries; a switch of capable of making or breaking an electric coupling between the auxiliary battery and the starter motor, and the auxiliaries and the main battery; and a control apparatus that diagnoses an abnormality in the auxiliary battery. The main battery is coupled to the auxiliaries via a DC-DC converter capable of stepping down a voltage of electricity stored in the main battery. The auxiliary battery is coupled to the auxiliaries via the switch. The controller diagnoses an abnormality in the auxiliary battery with the switch open.

17 Claims, 5 Drawing Sheets

(56) References Cited

U.S. PATENT DOCUMENTS

| | | | | |
|---|---|---|---|---|
| 2007/0170781 | A1* | 7/2007 | Jabaji | H02J 7/1423 |
| | | | | 307/10.1 |
| 2007/0276556 | A1* | 11/2007 | Noel | B60W 10/06 |
| | | | | 701/22 |
| 2008/0011528 | A1* | 1/2008 | Verbrugge | B60L 50/61 |
| | | | | 180/65.29 |
| 2010/0006360 | A1* | 1/2010 | Kishimoto | B60K 6/34 |
| | | | | 180/65.285 |
| 2010/0065349 | A1* | 3/2010 | Ichikawa | B60L 50/16 |
| | | | | 180/65.1 |
| 2012/0318213 | A1* | 12/2012 | Kobayashi | F01P 7/081 |
| | | | | 123/41.02 |
| 2013/0311061 | A1* | 11/2013 | Ando | B60W 10/26 |
| | | | | 701/102 |
| 2014/0062409 | A1* | 3/2014 | Endo | H02J 7/0026 |
| | | | | 320/126 |
| 2014/0167654 | A1* | 6/2014 | Brockerhoff | B60L 3/0046 |
| | | | | 318/139 |
| 2015/0329007 | A1* | 11/2015 | Matsunaga | B60L 50/13 |
| | | | | 320/126 |
| 2015/0357680 | A1* | 12/2015 | Erlbacher | H01L 29/0688 |
| | | | | 429/50 |
| 2016/0031324 | A1* | 2/2016 | Kim | H02J 7/1461 |
| | | | | 701/34.4 |
| 2016/0325738 | A1* | 11/2016 | Miyazaki | B60L 3/0084 |
| 2017/0145977 | A1* | 5/2017 | Toyama | B60L 15/20 |
| 2017/0259803 | A1* | 9/2017 | Khafagy | B60W 20/13 |
| 2018/0134176 | A1* | 5/2018 | Symanow | B60L 11/1868 |
| 2018/0208064 | A1* | 7/2018 | Wortberg | B60L 3/0046 |
| 2018/0312074 | A1* | 11/2018 | Tsutsumi | B60L 3/0046 |
| 2019/0018068 | A1* | 1/2019 | Graf | G01R 31/3842 |
| 2019/0040832 | A1* | 2/2019 | Namiki | F02N 11/0825 |
| 2019/0232788 | A1* | 8/2019 | Kimura | B60L 53/20 |
| 2019/0299968 | A1* | 10/2019 | Morita | B60K 6/26 |

\* cited by examiner

US 11,084,380 B2

POWER SUPPLY SYSTEM FOR A HYBRID VEHICLE

CROSS-REFERENCE TO RELATED APPLICATIONS

The present application claims priority from Japanese Patent Application No. 2018-132995 filed on Jul. 13, 2018, the entire contents of which are hereby incorporated by reference.

BACKGROUND

The disclosure relates to a power supply system.

In recent years, hybrid vehicles that run using a driving motor and an engine as drive sources have come to be widely used. A power supply system of a hybrid vehicle is provided with, as electricity supply sources, a main battery that stores electricity to be supplied to the driving motor, and an auxiliary battery that stores electricity to be supplied to auxiliaries. In such a power supply system, the main battery is coupled to the auxiliaries and the auxiliary battery via a DC-DC converter capable of stepping down the electricity (lowering the voltage of the electricity) stored in the main battery, as disclosed in Japanese Unexamined Patent Application Publication No. 2016-155439, for example. Therefore, the electricity stored in the main battery can be stepped down by the DC-DC converter and supplied to the auxiliaries and the auxiliary battery.

SUMMARY

An aspect of the disclosure provides a power supply system including: a driving motor capable of outputting power for driving a driving wheel; a main battery configured to store electricity to be supplied to the driving motor; an engine capable of outputting power for driving the driving wheel, a starter motor configured to start the engine; an auxiliary battery configured to store electricity to be supplied to the starter motor and auxiliaries; a switch capable of capable of making or breaking an electric coupling between the auxiliary battery and the starter motor, and the auxiliaries and the main battery; and a control apparatus comprising a controller configured to execute an abnormality diagnosis that diagnoses whether there is an abnormality in the auxiliary battery. The main battery is coupled to the auxiliaries via a DC-DC converter capable of stepping down an voltage of electricity stored in the main battery. The auxiliary battery is coupled to the auxiliaries via the switch. In the abnormality diagnosis, the controller diagnoses whether there is an abnormality in the auxiliary battery on a basis of an electrical state quantity of the auxiliary battery, in a state in which the switch has been caused to be open.

An aspect of the disclosure provides a power supply system including: a driving motor capable of outputting power for driving a driving wheel; a main battery configured to store electricity to be supplied to the driving motor; an engine capable of outputting power for driving the driving wheel, a starter motor configured to start the engine; an auxiliary battery configured to store electricity to be supplied to the starter motor and auxiliaries; a switch capable of capable of making or breaking an electric coupling between the auxiliary battery and the starter motor, and the auxiliaries and the main battery; and a control apparatus comprising circuitry configured to execute an abnormality diagnosis that diagnoses whether there is an abnormality in the auxiliary battery. The main battery is coupled to the auxiliaries via a DC-DC converter capable of stepping down an voltage of electricity stored in the main battery. The auxiliary battery is coupled to the auxiliaries via a switch capable of making or breaking an electric coupling between the auxiliary battery and the starter motor, and the auxiliaries and the main battery. In the abnormality diagnosis, the circuitry diagnoses whether there is an abnormality in the auxiliary battery on a basis of an electrical state quantity of the auxiliary battery, in a state in which the switch has been caused to be open.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
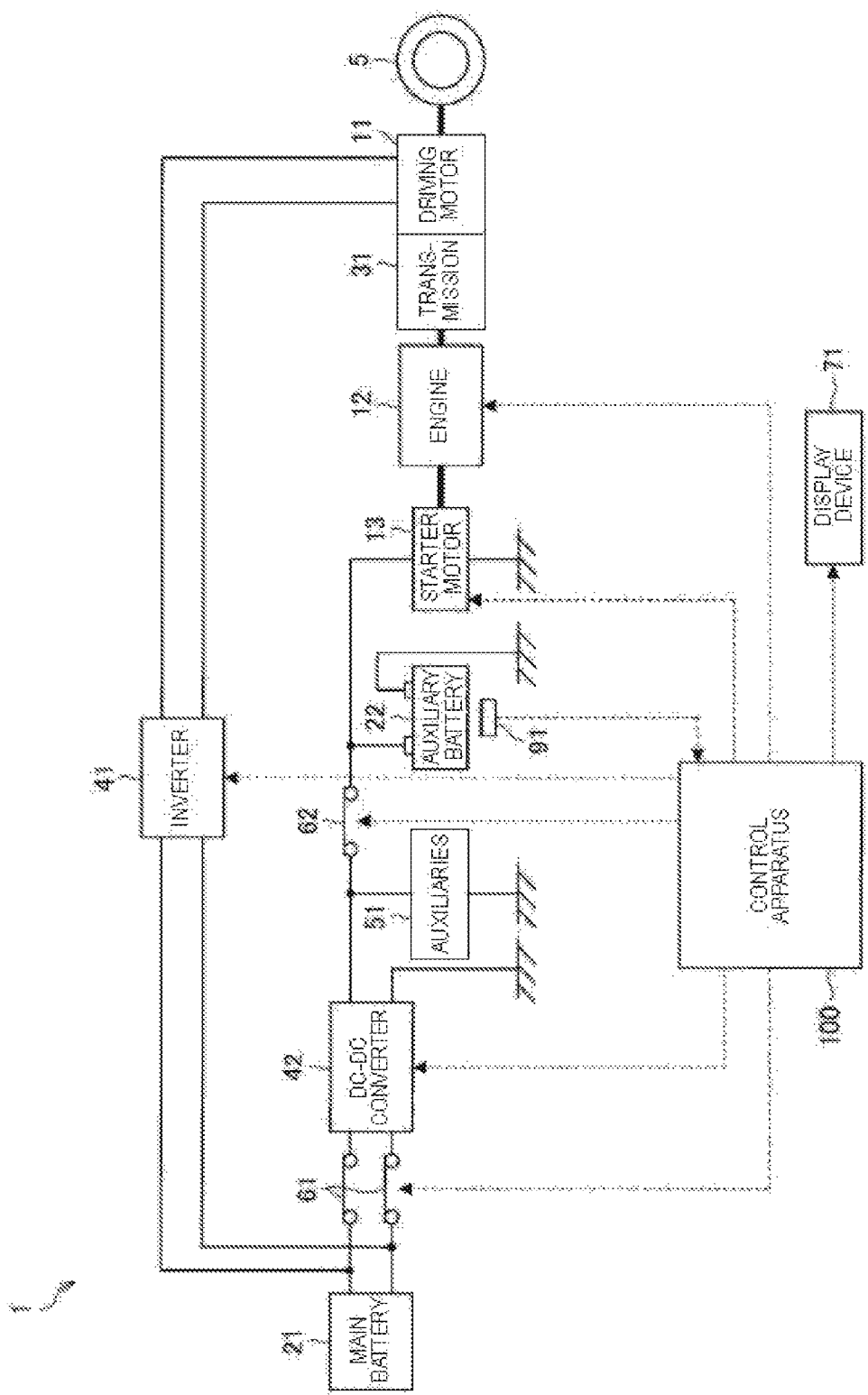
FIG. 1 is a schematic diagram of the general configuration of a power supply system according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. The engine of the power supply system described above is started by a starter motor for starting the engine being driven. Electricity stored in the auxiliary battery is normally used to drive the starter motor. Further, in the power supply system described above, the main battery is coupled to the auxiliaries and the auxiliary battery via the DC-DC converter, as described above, so the starter motor can also be driven using electricity stored in the main battery.

Here, a relatively large voltage needs to be applied to the starter motor to drive the starter motor, so in a case where an abnormality such as a short circuit is occurring in the auxiliary battery, it is difficult to drive the starter motor using the electricity stored in the auxiliary battery. Even in such a case, the engine can be started by stepping down the electricity stored in the main battery with the DC-DC converter and driving the starter motor using this power. However, at this time, the auxiliary battery in which the abnormality is occurring may be overcharged by the electricity supplied from the main battery, and consequently damaged.

Therefore, in order to inhibit the auxiliary battery from being overcharged as described above, it is considered desirable to properly diagnose whether there is an abnormality in the auxiliary battery. Specifically, diagnosing whether there is an abnormality in the auxiliary battery is performed on the basis of an electrical state quantity of the auxiliary battery. For example, it is possible to diagnose whether there is a short circuit in the auxiliary battery on the basis of an open end voltage of the auxiliary battery. However, electricity is supplied to auxiliaries inside the vehicle not only when the vehicle is traveling, but also when the vehicle is parked, so with a conventional power supply system, it is difficult to properly detect an electrical state quantity such as the open end voltage of the auxiliary battery. Therefore, it is difficult to properly diagnose whether there is an abnormality in the auxiliary battery.

Therefore, it is desirable to provide a new and improved power supply system in which it is possible to properly diagnose whether there is an abnormality in an auxiliary battery.

1. CONFIGURATION OF POWER SUPPLY SYSTEM

First, the configuration of a power supply system 1 according to an embodiment of the disclosure will be described with reference to FIG. 1 and FIG. 2.

FIG. 1 is a schematic diagram of the general configuration of the power supply system 1 according to the embodiment. FIG. 2 is a block diagram of an example of the functional configuration of a control apparatus 100 according to the embodiment.

Specifically, the power supply system 1 is a system that is mounted in a hybrid vehicle and is used to supply electricity to each device in the vehicle.

The power supply system 1 is provided with a driving motor 11, an engine 12, a starter motor 13, a main battery 21, an auxiliary battery 22, a DC-DC converter 42, auxiliaries 51, a diagnostic relay 62, and the control apparatus 100, as illustrated in FIG. 1. In addition, the power supply system 1 is provided with a transmission 31, an inverter 41, a system main relay 61, a display device 71, and a battery sensor 91. A vehicle equipped with the power supply system 1 is a vehicle that runs using the driving motor 11 and the engine 12 as drive sources.

In one embodiment, the diagnostic relay 62 may serve as a "switch". In one embodiment, the display device 71 may serve as an "information device".

The driving motor 11 is a motor capable of outputting power for driving driving wheels 5 of the vehicle. A polyphase alternating-current (three phase alternating-current for example) motor, for example, is used as the driving motor 11. The driving motor 11 is coupled to the main battery 21 via the inverter 41, and generates power using electricity supplied from the main battery 21 via the inverter 41. At this time, direct-current power discharged from the main battery 21 is converted to alternating-current power by the inverter 41 and then supplied to the driving motor 11.

Also, the driving motor 11 functions as a generator that generates power using the rotational energy of the driving wheels 5 when the vehicle is decelerating (i.e., has a regenerative function). At this time, alternating-current power generated by the driving motor 11 is converted to direct-current power by the inverter 41 and then supplied to the main battery 21. As a result, the main battery 21 is charged with electricity generated by the driving motor 11.

The engine 12 is an internal combustion engine that generates power using gasoline or the like as fuel, and is capable of outputting power for driving the driving wheels 5 of the vehicle. A crankshaft which is an output shaft of the engine 12 is coupled to the transmission 31 via a torque converter or a clutch and the like, not illustrated in the drawings. As the transmission 31, a transmission having a continuously variable mechanism, such as a continuously variable transmission (CVT), for example, is used. The power outputted from the engine 12 is shifted by the transmission 31 and then transmitted to the driving wheels 5. Note that the driving motor 11 described above may be coupled to the driving wheels 5 via the transmission 31, or may be coupled to the driving wheels 5 not via the transmission 31.

The starter motor 13 is a motor for starting the engine 12. An output shaft of the starter motor 13 is coupled to the crankshaft of the engine 12 via gears, such that the power outputted from the starter motor 13 is transmitted to the crankshaft of the engine 12. The starter motor 13 is coupled to the auxiliary battery 22, and generates power using electricity supplied from the auxiliary battery 22.

A direct-current motor or an alternating-current motor, for example, may be used as the starter motor 13. Note that, in a case where an alternating-current motor is used as the starter motor 13, the starter motor 13 is coupled to the auxiliary battery 22 via an inverter, not illustrated in the drawings, and direct-current power discharged from the auxiliary battery 22 is converted to alternating-current power by the inverter and then supplied to the starter motor 13.

Also, the starter motor 13 is capable of generating electricity using the kinetic energy of the engine 12. Electricity generated by the starter motor 13 is supplied to the auxiliary battery 22. As a result, the auxiliary battery 22 is charged with electricity generated by the starter motor 13. Note that the starter motor 13 does not have to have a function in which it generates electricity using the kinetic energy of the engine 12.

The main battery 21 is a battery that stores electricity to be supplied to the driving motor 11. Specifically, the main battery 21 is a battery of a higher voltage (100 V for example) than the auxiliary battery 22. A secondary battery such as a lithium-ion battery or a nickel hydride battery, for example, is used as the main battery 21.

The main battery 21 is coupled to the auxiliaries 51 via the DC-DC converter 42 that is capable of stepping down the electricity stored in the main battery 21. Therefore, the electricity stored in the main battery 21 can be stepped down by the DC-DC converter 42 and then supplied to the auxiliaries 51. The auxiliaries 51 include various equipment such as air conditioning equipment or audio equipment in the vehicle, for example. Specifically, the system main relay 61 is provided between the main battery 21 and the DC-DC converter 42. The system main relay 61 can make and break an electrical coupling between the main battery 21 and the DC-DC converter 42 on both a positive electrode side and a negative electrode side. The system main relay 61 is placed in a closed state after the power supply system 1 is activated.

Also, the main battery 21 is coupled to the auxiliary battery 22 via the diagnostic relay 62 that will be described later. Therefore, in a case where the diagnostic relay 62 is closed, the electricity stored in the main battery 21 can be stepped down by the DC-DC converter 42 and then supplied to the auxiliary battery 22 and the starter motor 13.

The auxiliary battery 22 is a battery that stores electricity to be supplied to the starter motor 13 and the auxiliaries 51. Specifically, the auxiliary battery 22 is a battery having a lower voltage (12 V for example) than the main battery 21. A secondary battery such as a lead battery or a lithium-ion battery, for example, is used as the auxiliary battery 22.

The auxiliary battery 22 is coupled to the auxiliaries 51 via the diagnostic relay 62. The diagnostic relay 62 is a switch that can make or break an electrical coupling between the auxiliary battery 22 and the starter motor 13, and the auxiliaries 51 and the main battery 21, and is provided to execute an abnormality diagnosis of the auxiliary battery 22, which will be described later. The diagnostic relay 62 is open when the abnormality diagnosis of the auxiliary battery 22 is executed, and is fundamentally closed when the abnormality diagnosis is not being executed. Therefore, when the abnormality diagnosis is not being executed, the electricity stored in the auxiliary battery 22 can fundamentally be supplied to the auxiliaries 51 via the diagnostic relay 62.

The display device 71 is a device that visually displays information. For example, a display that displays car navigation information or a lamp that blinks or illuminates to emit light or the like is used as the display device 71. Note that the display device 71 may be another device other than those described above as long as the display device 71 visually displays information. For example, the display device 71 may be a device that displays an image on a windshield of the vehicle, or the like.

The battery sensor 91 detects various state quantities of the auxiliary battery 22, and outputs these state quantities to the control apparatus 100. Specifically, the battery sensor 91 detects voltage and internal resistance of the auxiliary battery 22, as electrical state quantities of the auxiliary battery 22. Moreover, the battery sensor 91 detects the temperature of the auxiliary battery 22.

The control apparatus 100 is formed of a central processing unit (CPU) which is an calculation processor, read only memory (ROM) which is a storage element that stores calculation parameters and programs used by the CPU and the like, and random access memory (RAM) which is a storage element that temporarily stores parameters and the like that change, as appropriate, in the execution by the CPU, and the like.

Also, the control apparatus 100 communicates with each of the devices provided in the power supply system 1. Communication between the control apparatus 100 and each of the devices is realized using Controller Area Network (CAN) communication, for example.

Note that the function of the control apparatus 100 according to the embodiment may be at least partially divided among a plurality of control apparatuses, or a plurality of functions may be realized by a single control apparatus. For example, the function of the control apparatus 100 of controlling the operation of the driving motor 11, the function of the control apparatus 100 of controlling the operation of the engine 12, and other functions of the control apparatus 100, may be divided among separate control apparatuses. In a case where the function of the control apparatus 100 is at least partially divided among a plurality of control apparatuses, the plurality of control apparatuses may be coupled together via a communication bus such as CAN.

Figure 2:
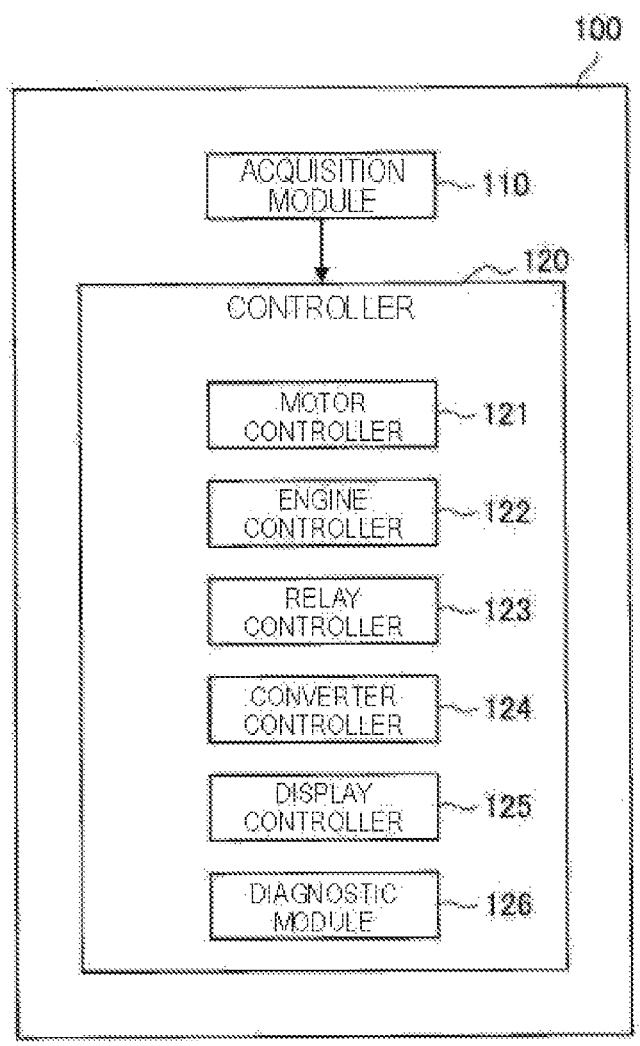
FIG. 2 is a block diagram of an example of the functional configuration of a control apparatus according to the embodiment.

As illustrated in FIG. 2, the control apparatus 100 includes an acquisition module 110 and a controller 120, for example.

The acquisition module 110 acquires various types of information used in processing performed by the controller 120. Also, the acquisition module 110 outputs the acquired information to the controller 120. For example, the acquisition module 110 acquires various types of information outputted from the battery sensor 91 by communicating with the battery sensor 91.

The controller 120 controls the operation of each device of the power supply system 1. For example, the controller 120 includes a motor controller 121, an engine controller 122, a relay controller 123, a converter controller 124, a display controller 125, and a diagnostic module 126.

The motor controller 121 controls the operation of the driving motor 11.

Specifically, the motor controller 121 controls supply of electricity between the driving motor 11 and the main battery 21 by controlling the operation of a switching element of the inverter 41. As a result, the motor controller 121 can control power generation and the generation of power by the driving motor 11. For example, the motor controller 121 works in coordination with the engine controller 122 to control the output of the driving motor 11 in accordance with the running state of the vehicle, such as an acceleration request and the vehicle speed. As a result, various traveling modes such as a mode in which the vehicle travels by the output of both the driving motor 11 and the engine 12, and a mode in which the vehicle travels by the output of only the engine 12, for example, can be executed in accordance with the running state of the vehicle.

The engine controller 122 controls the operation of the engine 12. Specifically, the engine controller 122 controls the throttle opening, ignition timing, and fuel injection quantity and the like, by controlling the operation of each device of the engine 12. As a result, the engine controller 122 can control the output of the engine 12. For example, the engine controller 122 works in coordination with the motor controller 121 to control the output of the engine 12 in accordance with the running state of the vehicle, such as an acceleration request and the vehicle speed, as described above.

Moreover, the engine controller 122 controls the operation of the starter motor 13. Specifically, the engine controller 122 can control electricity generation and the starting of the engine 12 by the starter motor 13, by controlling the supply of electricity between the starter motor 13 and the auxiliary battery 22.

For example, the engine controller 122 causes the starter motor 13 to be driven, and thus causes the engine 12 start, in accordance with an operation by the driver using an ignition switch. Also, for example, the engine controller 122 may execute control that causes the engine 12 to automatically stop and restart (e.g., idling stop control), and in such a case, causes the starter motor 13 to be driven, and thus causes the engine 12 to restart, when a restart condition is satisfied after the engine 12 has been automatically stopped.

Also, the engine controller 122 controls the voltage of the electricity generated by the starter motor 13 such that the voltage approaches a set target value. Here, the target value is stored in a storage element of the control apparatus 100, for example, and is fundamentally a value corresponding to the open end voltage of the auxiliary battery 22 when the auxiliary battery 22 is operating normally.

The relay controller 123 controls the operation of the system main relay 61 and the diagnostic relay 62. Specifically, the relay controller 123 controls the opening and closing of both the system main relay 61 and the diagnostic relay 62 by controlling the operation of each driving device, not illustrated in the drawings, that drives the system main relay 61 and the diagnostic relay 62, respectively.

More specifically, the relay controller 123 controls the opening and closing of the system main relay 61 in accordance with the operation by the driver using the ignition switch. For example, the relay controller 123 keeps the system main relay 61 open when the power supply system 1 is stopped when the ignition switch is placed in a READY-OFF position. However, the relay controller 123 keeps the system main relay 61 closed after the power supply system 1 is activated by the ignition switch being operated.

Also, the relay controller 123 keeps the diagnostic relay 62 open when an abnormality diagnosis of the auxiliary battery 22 is executed. However, the relay controller 123 fundamentally keeps the diagnostic relay 62 closed when the abnormality diagnosis is not being executed.

The converter controller 124 controls the operation of the DC-DC converter 42. Specifically, the converter controller 124 controls the supply of electricity between the main battery 21, and the auxiliaries 51, the auxiliary battery 22, and the starter motor 13, by controlling the operation of a switching element of the DC-DC converter 42.

The display controller 125 controls the operation of the display device 71. Specifically, the display controller 125 controls the display by the display device 71, by outputting information indicative of the content to be displayed with respect to the display device 71.

The diagnostic module 126 executes, in cooperation with the relay controller 123, an abnormality diagnosis to diagnose whether there is an abnormality in the auxiliary battery 22. Specifically, in an abnormality diagnosis, the diagnostic module 126 diagnoses whether there is an abnormality in the auxiliary battery 22 on the basis of an electrical state quantity of the auxiliary battery 22.

For example, the diagnostic module 126 diagnoses whether there is a short circuit in the auxiliary battery 22 as the abnormality of the auxiliary battery 22 on the basis of the open end voltage of the auxiliary battery 22 as the electrical state quantity. Specifically, a short circuit in the auxiliary battery 22 is a state in which a short circuit is occurring within a cell in the auxiliary battery 22. In a case where the auxiliary battery 22 is short circuiting, the open end voltage of the auxiliary battery 22 is lower than normal.

Note that, in the description below, an example in which whether there is a short circuit in the auxiliary battery 22 is diagnosed in the abnormality diagnosis of the auxiliary battery 22 is mainly described, but whether another state other than a short circuit in the auxiliary battery 22 exists may be diagnosed as whether there is an abnormality in the auxiliary battery 22. For example, the diagnostic module 126 may diagnose whether the auxiliary battery 22 is deteriorated as the abnormality of the auxiliary battery 22, on the basis of internal resistance of the auxiliary battery 22 as the electrical state quantity. Deterioration of the auxiliary battery 22 is a state in which the electrodes within a cell in the auxiliary battery 22 are chemically or physically deteriorated. In a case where the auxiliary battery 22 is deteriorated, the internal resistance of the auxiliary battery 22 is larger than normal.

As described above, the controller 120 can execute the abnormality determination of the auxiliary battery 22. Specifically, in the abnormality diagnosis, the controller 120 diagnosis whether there is an abnormality in the auxiliary battery 22 on the basis of the electrical state quantity of the auxiliary battery 22, in a state in which the diagnostic relay 62 is open. As a result, it is possible to properly diagnose whether there is an abnormality in the auxiliary battery 22. The details of the processing relating to such an abnormality diagnosis of the auxiliary battery 22 performed by the controller 120 will be described later.

2. OPERATION OF POWER SUPPLY SYSTEM

Next, the operation of the power supply system 1 according to the embodiment of the disclosure will be described with reference to FIG. 3 to FIG. 5.

Figure 3:
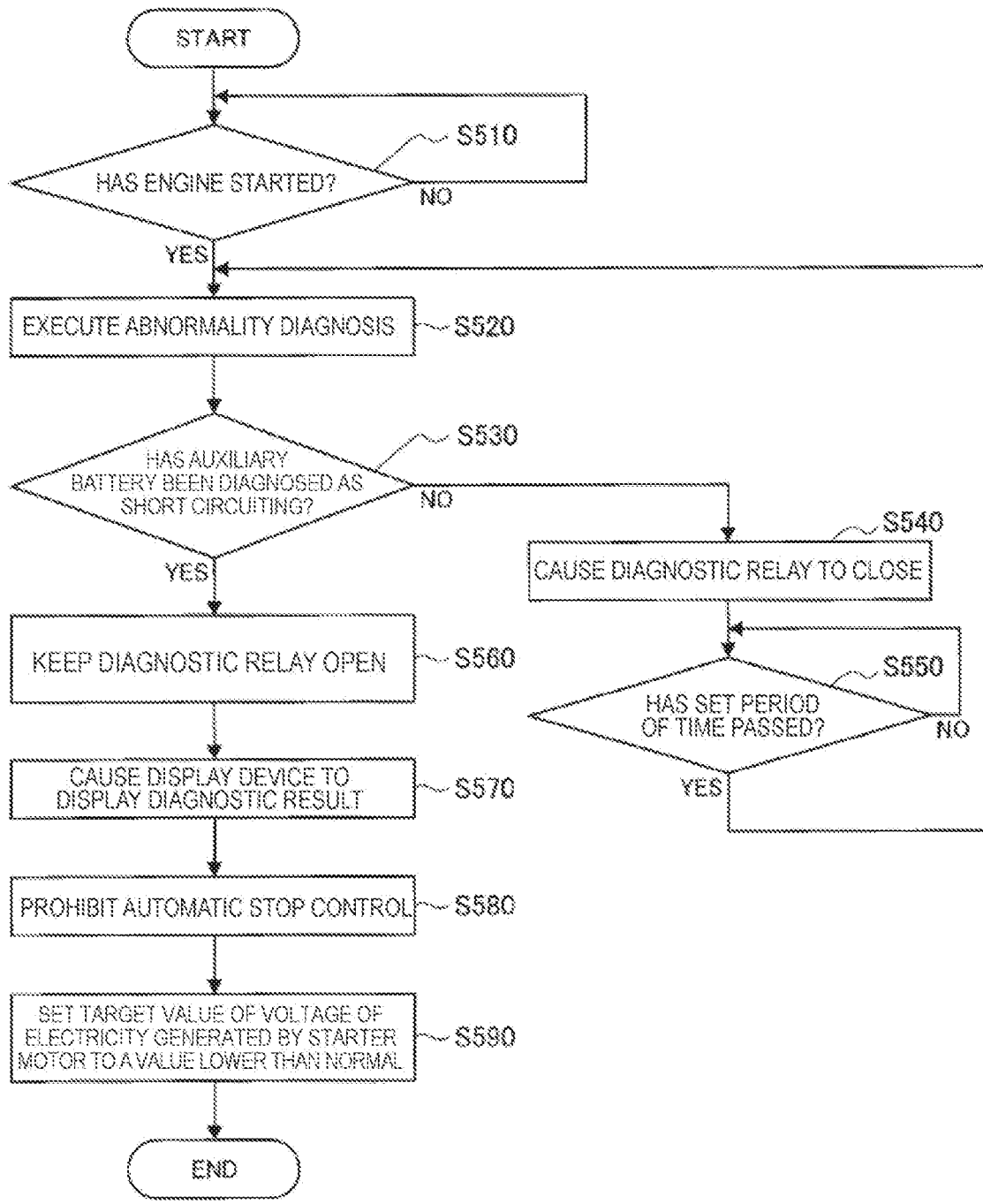
FIG. 3 is a flowchart illustrating an example of a flow of processing performed by the control apparatus according to the embodiment.
Figure 4:
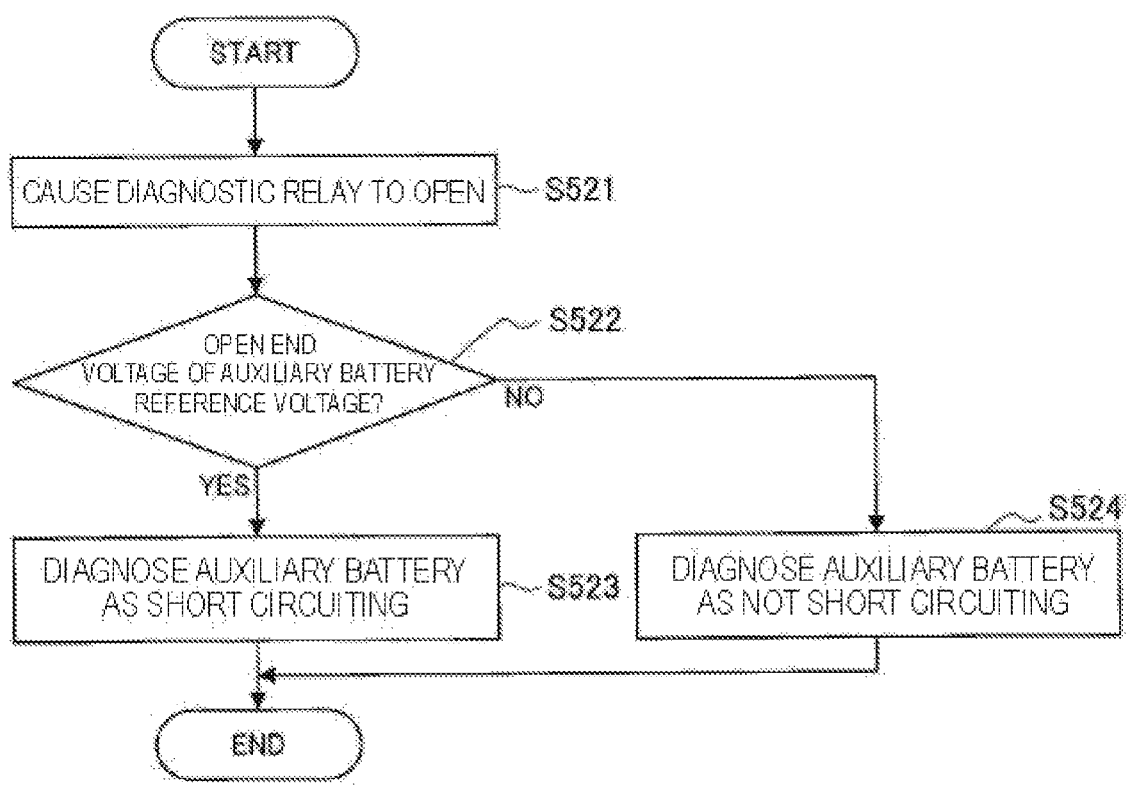
FIG. 4 is a flowchart illustrating an example of a flow of processing in an abnormality diagnosis performed by the control apparatus according to the embodiment.

Note that the control flow illustrated in FIG. 3 and FIG. 4 corresponds to an example in which whether there is a short circuit in the auxiliary battery 22 is diagnosed as whether there is an abnormality in the auxiliary battery 22, but whether another state (whether the auxiliary battery 22 is deteriorated for example) other than a short circuit in the auxiliary battery 22 exists may be diagnosed as whether there is an abnormality in the auxiliary battery 22.

FIG. 3 is a flowchart illustrating an example of a flow of processing performed by the control apparatus 100 according to the embodiment. Specifically, the control flow illustrated in FIG. 3 illustrates an example of a flow of processing related to the abnormality diagnosis of the auxiliary battery 22 performed by the controller 120. Note that the control flow illustrated in FIG. 3 starts after the power supply system 1 is activated, for example.

When the control flow illustrated in FIG. 3 starts, first, the controller 120 determines in step S510 whether the engine 12 has started. If it is determined that the engine 12 has started (YES in step S510), the processing proceeds on to step S520. However, if it is determined that the engine 12 has not started (NO in step S510), the determination processing of step S510 is repeated.

If the determination in step S510 is YES, the controller 120 then executes an abnormality diagnosis of the auxiliary battery 22 in step S520. In the abnormality diagnosis, specifically, the controller 120 diagnoses whether there is a short circuit in the auxiliary battery 22, on the basis of the open end voltage of the auxiliary battery 22.

Hereinafter, an example of the processing of the abnormality diagnosis will be described in detail with reference to FIG. 4 and FIG. 5. FIG. 4 is a flowchart illustrating an example of a flow of processing in an abnormality diagnosis performed by the control apparatus 100 according to the embodiment. Specifically, the control flow illustrated in FIG. 4 corresponds to an example of the processing in step S520 in the control flow illustrated in FIG. 3. FIG. 5 is a schematic diagram of the power supply system 1 according to the embodiment in a state in which the diagnostic relay 62 is open.

When the control flow illustrated in FIG. 4 starts, first, in step S521, the relay controller 123 causes the diagnostic relay 62 to open. As a result, a state in which the auxiliary battery 22 and the starter motor 13 are electrically cut off from the auxiliaries 51 and the main battery 21 is established, as illustrated in FIG. 5. Therefore, electricity stops being supplied from the auxiliary battery 22 to the auxiliaries 51, and electricity stops being supplied from the main battery 21 to the auxiliary battery 22. Consequently, a state in which current is not flowing to the auxiliary battery 22 is established. As a result, the control apparatus 100 is able to acquire the detection value of the voltage of the auxiliary battery 22 detected by the battery sensor 91 in a state in which current is not flowing to the auxiliary battery 22, so the open end voltage of the auxiliary battery 22 can be properly acquired.

Figure 5:
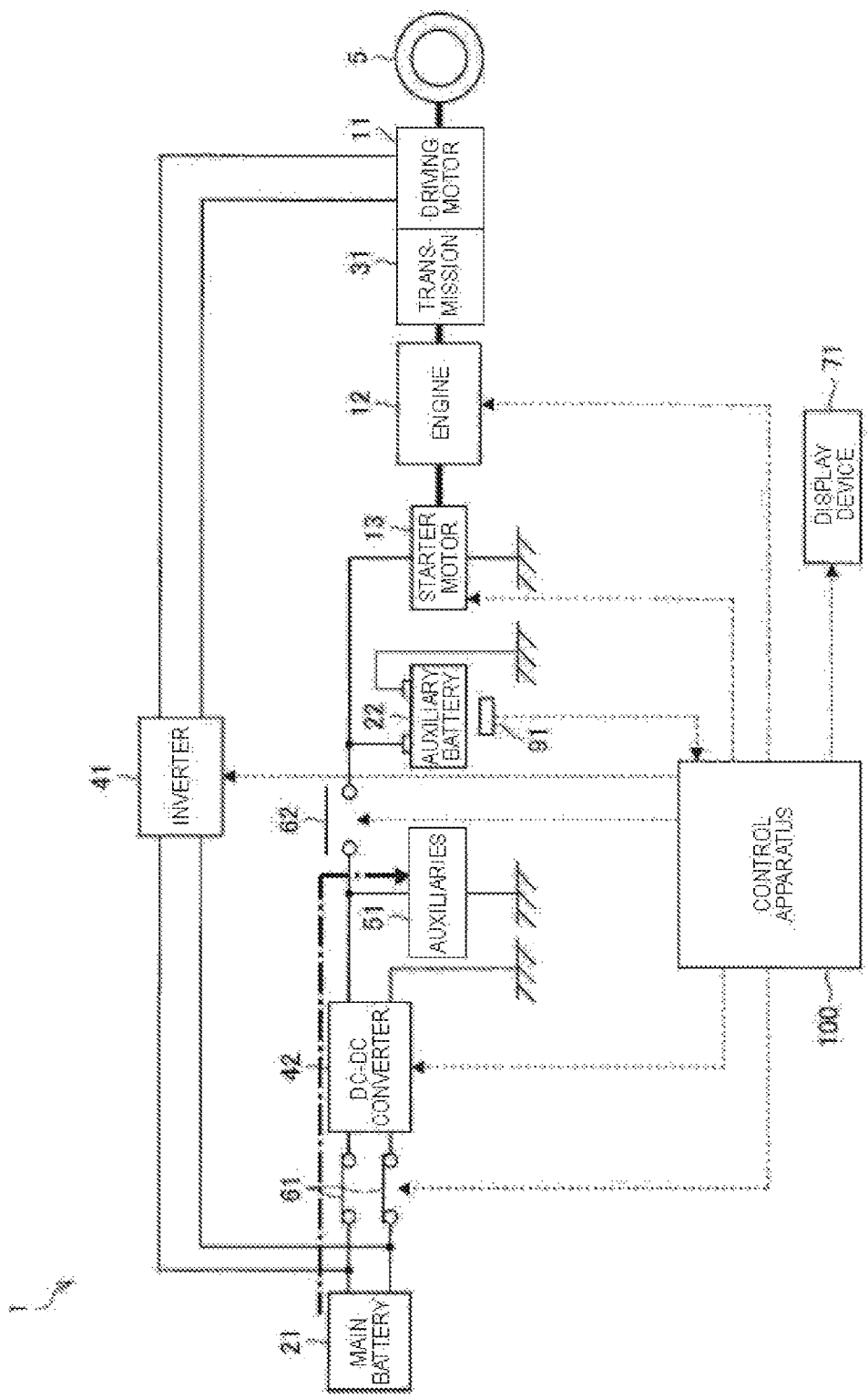
FIG. 5 is a schematic diagram of the power supply system according to the embodiment in a state in which a diagnostic relay is open.

Here, in an abnormality diagnosis in which the diagnostic relay 62 is open, the controller 120 steps down the electricity stored in the main battery 21 with the DC-DC converter 42 and supplies the stepped-down power to the auxiliaries 51, as indicated by the alternate long and short dash arrow in FIG. 5. As a result, electricity can be properly supplied to the auxiliaries 51 even in an abnormality diagnosis in which the diagnostic relay 62 is open.

Next, in step S522, the diagnostic module 126 determines whether the open end voltage of the auxiliary battery 22 is lower than a reference voltage. If it is determined that the open end voltage of the auxiliary battery 22 is lower than the reference voltage (YES in step S522), the processing proceeds on to step S523. However, if it is determined that the open end voltage of the auxiliary battery 22 is equal to or higher than the reference voltage (NO in step S522), the processing proceeds on to step S524.

Specifically, the reference voltage is set to a value by which it is possible to properly determine whether the auxiliary battery 22 is short circuiting. For example, the reference voltage is set according to the open end voltage of the auxiliary battery 22 when the auxiliary battery 22 is operating normally. In one embodiment, the reference voltage may serve as a "reference value". Specifically, the diagnostic module 126 compares the open end voltage with the reference voltage when the fluctuation of the detection value of the open end voltage of the auxiliary battery 22 decreases and the detection value of the open end voltage becomes stable, after the diagnostic relay 62 is opened.

If the determination in step S522 is YES, then in step S523, the diagnostic module 126 diagnoses the auxiliary battery 22 as short circuiting. However, if the determination in step S522 is NO, then in step S524, the diagnostic module 126 diagnoses the auxiliary battery 22 as not short circuiting.

As described above, from the viewpoint of properly diagnosing whether there is an abnormality in the auxiliary battery 22, the controller 120 preferably diagnoses whether there is an abnormality in the auxiliary battery 22 on the basis of a comparative result of the electrical state quantity of the auxiliary battery 22 and the reference value.

Here, from the viewpoint of properly diagnosing whether there is an abnormality in the auxiliary battery 22, the controller 120 more preferably causes the reference value to change in accordance with the temperature of the auxiliary battery 22. For example, the controller 120 may cause the reference voltage used in the comparison with the open end voltage of the auxiliary battery 22 in step S522 to change so that the reference value becomes smaller as the temperature of the auxiliary battery 22 becomes lower. The open end voltage of the auxiliary battery 22 has a tendency to decrease as the temperature of the auxiliary battery 22 becomes lower, so it is possible to more properly diagnose whether there is a short circuit in the auxiliary battery 22 by causing the reference voltage to change in accordance with the temperature of the auxiliary battery 22 as described above.

Note that, in the abnormality diagnosis, the diagnostic module 126 may diagnose whether the auxiliary battery 22 is deteriorated, on the basis of the internal resistance of the auxiliary battery 22, as described above. In this case as well, the controller 120 executes the abnormal diagnosis in a state in which the diagnostic relay 62 is open. As a result, the control apparatus 100 can acquire the detection value of the internal resistance of the auxiliary battery 22 detected by the battery sensor 91 in a state in which current is not flowing to the auxiliary battery 22. Also, in this case as well, the processing after step S530, which will be described later, is similar to the case of diagnosing whether there is a short circuit in the auxiliary battery 22.

In a case of diagnosing whether the auxiliary battery 22 is deteriorated, specifically, the diagnostic module 126 diagnoses the auxiliary battery 22 as deteriorated in a case where the internal resistance of the auxiliary battery 22 is greater than a reference resistance. However, the diagnostic module 126 diagnoses the auxiliary battery 22 as not deteriorated in a case where the internal resistance of the auxiliary battery 22 is equal to or less than the reference resistance.

Specifically, the reference resistance is set to a value by which it is possible to properly determine whether the auxiliary battery 22 is deteriorated. For example, the reference resistance is set in accordance with the internal resistance of the auxiliary battery 22 when the auxiliary battery 22 is operating normally. In one embodiment, the reference resistance may serve as an example of a "reference value". Specifically, the diagnostic module 126 compares the internal resistance to the reference resistance when the fluctuation of the detection value of the internal resistance of the auxiliary battery 22 decreases and the detection value of the internal resistance becomes stable, after the diagnostic relay 62 is opened.

Here, the controller 120 may cause the reference resistance used in the comparison with the internal resistance of the auxiliary battery 22 to change such that the reference resistance becomes larger as the temperature of the auxiliary battery 22 becomes lower. The internal resistance of the auxiliary battery 22 has a tendency to increase as the temperature of the auxiliary battery 22 becomes lower, so it is possible to more properly diagnose whether the auxiliary battery 22 is deteriorated, by causing the reference resistance to change in accordance with the temperature of the auxiliary battery 22 as described above.

Note that, from the viewpoint of properly diagnosing whether there is an abnormality in the auxiliary battery 22, the controller 120 preferably both diagnoses whether there is a short circuit in the auxiliary battery 22 and diagnoses whether the auxiliary battery 22 is deteriorated.

Hereinafter, the processing in steps S530 and thereafter in the control flow illustrated in FIG. 3 will be described.

In step S530, the controller 120 determines whether the auxiliary battery 22 has been diagnosed as short circuiting. If it is determined that the auxiliary battery 22 has been diagnosed as short circuiting (YES in step S530), the processing proceeds on to step S560. However, if it is determined that the auxiliary battery 22 is not short circuiting (NO in step S530), the processing proceeds on to step S540.

If the determination in step S530 is NO, the relay controller 123 then causes the diagnostic relay 62 to close in step S540. As a result, a state in which the auxiliary battery 22 and the starter motor 13 are electrically coupled to the auxiliaries 51 and the main battery 21 is established, as illustrated in FIG. 1. Therefore, the electricity stored in the auxiliary battery 22 can be supplied to the auxiliaries 51. Also, the electricity stored in the main battery 21 can be stepped down by the DC-DC converter 42 and supplied to the auxiliary battery 22 to charge the auxiliary battery 22.

Next, in step S550, the controller 120 determines whether a set period of time has passed. If it is determined that the set period of time has passed (YES in step S550), the processing returns to step S520. However, if it is determined that the set period of time has not passed (NO in step S550), the determination processing of step S550 is repeated.

The set period of time can be set, as appropriate, from the viewpoint of optimizing the frequency of the abnormality diagnosis of the auxiliary battery 22 so that the frequency is not too frequency or too infrequent.

As described above, if the determination of the abnormality diagnosis in step S530 is NO, the processing returns to step S520 after the set period of time has passed, and the abnormality diagnosis is executed again. Therefore, the abnormality diagnosis is repeated each set period of time while the state in which the auxiliary battery 22 is not short circuiting continues.

If the determination in step S530 is YES, the relay controller 123 keeps the diagnostic relay 62 open in step S560. As a result, even after the abnormality diagnosis, the state in which the auxiliary battery 22 and the starter motor 13 are electrically cut off from the auxiliaries 51 and the main battery 21 is maintained, as illustrated in FIG. 5.

Here, the controller 120 causes the electricity stored in the main battery 21 to be stepped down by the DC-DC converter 42, and supplies the stepped-down electricity to the auxiliaries 51. As a result, electricity can be properly supplied to the auxiliaries 51 while the diagnostic relay 62 is kept in an open state.

Next, in step S570, the display controller 125 causes the display device 71 to display the diagnostic result. Specifically, the display controller 125 causes the display device 71 to display information indicating that the auxiliary battery 22 is short circuiting as the diagnostic result. At this time, the mode of the display by the display device 71 is not particularly limited. For example, the display controller 125 may cause the display device 71 to display a mark indicating the diagnostic result, or may cause the display device 71 to display text indicating the diagnostic result.

As described above, from the viewpoint of appropriately notifying the driver of the diagnostic result, the controller 120 preferably causes a notification device to report the diagnostic result in case where the auxiliary battery 22 is diagnosed as operating abnormally. Here, another device other than the display device 71 may be used as the notification device that reports information. For example, the controller 120 may cause a sound output device to output a sound in accordance with the diagnostic result.

Next, in step S580, the engine controller 122 prohibits automatic stop control that causes the engine 12 to automatically stop. For example, the engine controller 122 prohibits idling stop control in a case where the auxiliary battery 22 is diagnosed as operating abnormally. Note that the automatic stop control may be control other than idling stop control as long as it is control that causes the engine 12 to automatically stop irrespective of an intention of the driver. For example, the automatic stop control may be control that causes the engine 12 to automatically stop in a case where the vehicle speed has become slower than a set speed.

Next, in step S590, the engine controller 122 sets the target value of the voltage of the electricity generated by the starter motor 13 to a value lower than the value when the auxiliary battery 22 is operating normally. As described above, the engine controller 122 controls the voltage of the electricity generated by the starter motor 13 such that the voltage approaches the target value. Therefore, the voltage of the electricity generated by the starter motor 13 can be controlled to a value lower than the value when the auxiliary battery 22 is operating normally, by setting the target value to a value lower than the value when the auxiliary battery 22 is operating normally.

Next, the control flow illustrated in FIG. 3 ends.

Note that, in the description above, an example was described in which the abnormality diagnosis of the auxiliary battery 22 is executed immediately after the engine 12 starts, and is then repeatedly executed every set period of time, but the timing at which the abnormality diagnosis is executed is not particularly limited to the example described above.

Specifically, the trigger for executing the initial abnormality diagnosis, in the flow of the processing related to the abnormality diagnosis of the auxiliary battery 22 performed by the controller 120, is not particularly limited to the example described above. For example, fundamentally, even in a case where the abnormality diagnosis is executed with the starting of the engine 12 as the trigger, the abnormality diagnosis may be executed only in a case where the time between the start of cranking until complete ignition of the engine 12 is reached is equal to or longer than a reference time. As a result, it is possible to inhibit the frequency of the abnormality diagnosis from becoming too frequent. Note that the state in which complete ignition of the engine 12 is reached means a state in which ignition is performed in each engine cycle in the engine 12 (i.e., the state in which startup of the engine 12 is complete). For example, the controller 120 determines that complete ignition of the engine 12 has been reached in a case where the rotation speed of the engine 12 has reached a target rotation speed set in advance. Also, the reference time is set to a period of time that is assumed long enough when the auxiliary battery 22 is operating normally, as the time between the start of cranking until complete ignition of the engine 12 is reached, for example.

Also, the trigger for executing the abnormality diagnosis again after the abnormality diagnosis has been executed, in the flow of the processing related to the abnormality diagnosis of the auxiliary battery 22 performed by the controller 120, is not particularly limited to the example described above. For example, the abnormality diagnosis may be executed again with the restarting of the engine 12 as the trigger. Also, for example, the abnormality diagnosis may be executed again with the integrated value of the current value of the current that flows to the auxiliary battery 22 being equal to or greater than a reference integrated value as the trigger. Note that the current value of the current that flows into the auxiliary battery 22 is detected by the battery sensor 91, for example, and the reference integrated value is set to a value by which it is possible to properly determine whether a large amount of current has flowed into the auxiliary battery 22 to the extent that overcharging may occur, for example. Also, for example, fundamentally, even in a case where the abnormality diagnosis is executed again with the set period of time having passed as the trigger, the abnormality diagnosis does not have to be executed again in a case where the integrated value of the current value of the current that flows into the auxiliary battery 22 is less than the reference integrated value when the set period of time has passed. As a result, it is possible to inhibit the frequency of the abnormality diagnosis from becoming too frequent.

Here, in a case where the engine 12 is to be restarted during an abnormality diagnosis of the auxiliary battery 22, electricity must be supplied from the auxiliary battery 22 to the starter motor 13, so the abnormality diagnosis would be interrupted. Therefore, from the viewpoint of inhibiting the abnormality diagnosis from being interrupted, the abnormality diagnosis of the auxiliary battery 22 is preferably performed when the engine 12 is not stopped. Note that the abnormality diagnosis of the auxiliary battery 22 may be executed when the vehicle is parked. In this case, specifically, when the vehicle is parked, the abnormality diagnosis can be executed by placing the system main relay 61 in a closed state, placing the diagnostic relay 62 in an open state, and supplying electricity stored in the main battery 21 to the auxiliaries 51.

3. EFFECTS OF POWER SUPPLY SYSTEM

Next, the effects of the power supply system 1 according to the embodiment of the disclosure will be described.

With the power supply system 1 according to the embodiment, the auxiliary battery 22 is coupled to the auxiliaries 51 via the diagnostic relay 62 as a switch that can make or break an electrical coupling between the auxiliary battery 22 and the starter motor 13, and the auxiliaries 51 and the main battery 21. Also, in the abnormality diagnosis, the controller 120 diagnoses whether there is an abnormality in the auxiliary battery 22 on the basis of the electrical state quantity of the auxiliary battery 22, in a state in which diagnostic relay 62 is caused to be open. As a result, in the abnormality diagnosis, a state in which the auxiliary battery 22 and the starter motor 13 are electrically cut off from the auxiliaries 51 and the main battery 21 can be established. Therefore, a state in which current is not flowing to the auxiliary battery 22 can be established, so the electrical state quantity of the auxiliary battery 22 can be properly acquired. As a result, it is possible to properly diagnose whether there is an abnormality in the auxiliary battery 22.

Furthermore, according to the embodiment, it is possible to properly inhibit the auxiliary battery 22 in which an abnormality is occurring from being overcharged by electricity supplied from the main battery 21, and consequently damaged, by being able to properly diagnose whether there is an abnormality in the auxiliary battery 22 as described above.

Also, with the power supply system 1 according to the embodiment, in the abnormality diagnosis, the controller 120 preferably diagnoses whether there is a short circuit in the auxiliary battery 22 as the abnormality of the auxiliary battery 22, on the basis of the open end voltage of the auxiliary battery 22 as the state quantity. As described above, in an abnormality diagnosis, a state in which current is not flowing to the auxiliary battery 22 can be established by executing the abnormality diagnosis in a state in which the diagnostic relay 62 is caused to be open, so the open end voltage of the auxiliary battery 22 can be properly acquired. Therefore, it is possible to diagnose whether there is a short circuit in the auxiliary battery 22 on the basis of the open end voltage that is properly acquired in this way, so it is possible to properly diagnose whether there is a short circuit in the auxiliary battery 22.

Also, with the power supply system 1 according to the embodiment, in the abnormality diagnosis, the controller 120 preferably diagnoses whether the auxiliary battery 22 is deteriorated as the abnormality of the auxiliary battery 22, on the basis of the internal resistance of the auxiliary battery 22 as the state quantity. As described above, in an abnormality diagnosis, a state in which current is not flowing to the auxiliary battery 22 can be established by executing the abnormality diagnosis in a state in which the diagnostic relay 62 is caused to be open, so the internal resistance of the auxiliary battery 22 can be properly acquired. Therefore, it is possible to diagnose whether the auxiliary battery 22 is deteriorated, on the basis of the internal resistance that is properly acquired in this way, so it is possible to properly diagnose whether the auxiliary battery 22 is deteriorated.

Also, with the power supply system 1 according to the embodiment, the controller 120 preferably diagnoses whether there is an abnormality in the auxiliary battery 22 on the basis of the comparison result between the state quantity and the reference value. As a result, it is possible to more properly diagnose whether there is an abnormality in the auxiliary battery 22, by properly setting the reference value in accordance with the specifications of the auxiliary battery 22.

Also, with the power supply system 1 according to the embodiment, the controller 120 preferably causes the reference value to change in accordance with the temperature of the auxiliary battery 22. Here, the electrical state quantity of the auxiliary battery 22 can change according to the temperature of the auxiliary battery 22. Therefore, it is possible to more properly diagnose whether there is a short circuit in the auxiliary battery 22, by properly causing the reference value to change in accordance with the temperature of the auxiliary battery 22.

Also, with the power supply system 1 according to the embodiment, in the abnormality diagnosis, the controller 120 preferably causes the electricity stored in the main battery 21 to be stepped down by the DC-DC converter 42, and then supplies the stepped-down electricity to the auxiliaries 51. As described above, the abnormality diagnosis is executed in a state in which the diagnostic relay 62 is caused to be open, so in the abnormality diagnosis, the supply of electricity from the auxiliary battery 22 to the auxiliaries 51 is stopped. Therefore, in the abnormality diagnosis, electricity can be properly supplied to the auxiliaries 51 by causing the electricity stored in the main battery 21 to be stepped down by the DC-DC converter 42 and then supplying the stepped-down electricity to the auxiliaries 51.

Also, with the power supply system 1 according to the embodiment, in a case where the auxiliary battery 22 is diagnosed as operating abnormally, the controller 120 preferably keeps the diagnostic relay 62 in an open state, causes the electricity stored in the main battery 21 to be stepped down by the DC-DC converter 42, and then supplies the stepped-down electricity to the auxiliaries 51. As a result, in a case where the auxiliary battery 22 is diagnosed as operating abnormally, electricity can be properly supplied to the auxiliaries 51 while the diagnostic relay 62 is kept in an open state. Therefore, it is possible to properly inhibit electricity from being supplied from the main battery 21 to the auxiliary battery 22, so it is possible to properly inhibit the auxiliary battery 22 in which an abnormality is occurring from being overcharged, and consequently damaged.

Also, with the power supply system 1 according to the embodiment, the controller 120 preferably causes the notification device to report the diagnostic result in case where the auxiliary battery 22 is diagnosed as operating abnormally. As a result, the driver can be properly notified of the diagnostic result. Therefore, the driver can be prompted to repair the auxiliary battery 22.

Also, with the power supply system 1 according to the embodiment, the controller 120 preferably prohibits automatic stop control that causes the engine 12 to automatically stop, in a case where the auxiliary battery 22 is diagnosed as operating abnormally. As a result, it is possible to inhibit the engine 12 from being restarted in a case where there is an abnormality in the auxiliary battery 22. Therefore, it is possible to inhibit electricity from being supplied from the auxiliary battery 22 to the starter motor 13 in order to restart the engine 12. Consequently, it is possible to properly inhibit the auxiliary battery 22 in which an abnormality is occurring from being damaged due to the auxiliary battery 22 being discharged.

Also, with the power supply system 1 according to the embodiment, in a case where the auxiliary battery 22 is diagnosed as operating abnormally, the controller 120 preferably controls the voltage of the electricity generated by the starter motor 13 to a value lower than the value when the auxiliary battery 22 is operating normally. As a result, the auxiliary battery 22 in which an abnormality is occurring can be properly charged while the auxiliary battery 22 is inhibited from being overcharged.

4. CONCLUSION

As described above, with the power supply system 1 according to the embodiment, the auxiliary battery 22 is coupled to the auxiliaries 51 via the diagnostic relay 62 as a switch that can make or break an electrical coupling between the auxiliary battery 22 and the starter motor 13, and the auxiliaries 51 and the main battery 21. Also, in the abnormality diagnosis, the controller 120 diagnoses whether there is an abnormality in the auxiliary battery 22 on the basis of the electrical state quantity of the auxiliary battery 22, in a state in which the diagnostic relay 62 is caused to be open. As a result, in the abnormality diagnosis, a state in which current is not flowing to the auxiliary battery 22 can be established, so the electrical state quantity of the auxiliary battery 22 can be properly acquired, and as a result, it is possible to properly diagnose whether there is an abnormality in the auxiliary battery 22.

Although the preferred example of the disclosure has been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

Note that it is not necessary for the processing described in this specification with reference to the flowchart to be executed in the order illustrated in the flowchart. Some processing steps may be performed in parallel. For example, the processing of steps S560, S570, S580, and S590 in the flowchart illustrated in FIG. 3 may be executed in the order illustrated in FIG. 3 or they may be executed in parallel. Further, some of additional steps can be adopted, or some processing steps can be omitted Also, for example, in the description above, the configuration of the power supply system 1 has been described as an example of the power supply system according to the disclosure with reference to FIG. 1, but the configuration of the power supply system according to the disclosure is not limited to such an example, as described above. For example, the power supply system according to the disclosure may be provided with a plurality of driving motors as drive sources.

The invention claimed is:

1. A power supply system comprising:
a driving motor capable of outputting power for driving a driving wheel;
a main battery configured to store electricity to be supplied to the driving motor;
an engine capable of outputting power for driving the driving wheel;
a starter motor configured to start the engine;
an auxiliary battery configured to store electricity to be supplied to the starter motor and auxiliaries;
a switch disposed between the auxiliary battery and the auxiliaries to make or break an electric coupling between a first group including the auxiliary battery and the starter motor and a second group including the auxiliaries and the main battery, wherein the switch is set to a closed state to make the electric coupling between the first group and the second group, and wherein the switch is set to an open state to break the electric coupling between the first group and the second group; and
a controller configured to execute an abnormality diagnosis that diagnoses whether there is an abnormality in the auxiliary battery on a basis of an electrical state quantity of the auxiliary battery,
wherein the controller controls the switch to be in the open state prior to executing the abnormality diagnosis such that the switch is in the open state every time the abnormality diagnosis is executed, and
wherein the controller controls the switch to be in 1) the open state when a result of the abnormality diagnosis indicates that there is the abnormality in the auxiliary battery and 2) the closed state when the result of the abnormality diagnosis indicates that there is no abnormality in the auxiliary battery.

2. The power supply system according to claim 1, wherein in the abnormality diagnosis, the controller diagnoses whether there is a short circuit in the auxiliary battery as the abnormality of the auxiliary battery, on a basis of an open end voltage of the auxiliary battery as the state quantity.

3. The power supply system according to claim 2, wherein in the abnormality diagnosis, the controller diagnoses whether the auxiliary battery is deteriorated as the abnormality of the auxiliary battery, on a basis of an internal resistance of the auxiliary battery as the state quantity.

4. The power supply system according to claim 2, wherein the controller diagnoses whether there is an abnormality in the auxiliary battery on a basis of a comparison result between the state quantity and a reference value.

5. The power supply system according to claim 4, wherein the controller causes the reference value to change in accordance with a temperature of the auxiliary battery.

6. The power supply system according to claim 2, further comprising a DC-DC converter disposed between the main battery and the auxiliaries, the DC-DC converter being capable of stepping down an voltage of electricity stored in the main battery,
wherein, in the abnormality diagnosis, the controller causes electricity stored in the main battery to be stepped down by the DC-DC converter and supplies the stepped-down electricity to the auxiliaries.

7. The power supply system according to claim 2, further comprising an information device configured to report a diagnostic result of the abnormality diagnosis,
wherein in a case where the auxiliary battery is diagnosed as operating abnormally, the controller causes the information device to report the diagnostic result indicating that the auxiliary battery is abnormally operating.

8. The power supply system according to claim 2,
wherein the controller executes the abnormality diagnosis while the engine is running,
wherein in a case where the auxiliary battery is diagnosed as operating normally, the controller executes an automatic stop control that causes the engine to automatically stop irrespective of an intention of a driver, and
wherein in a case where the auxiliary battery is diagnosed as operating abnormally, the controller prohibits automatic stop control that causes the engine to automatically stop.

9. The power supply system according to claim 2, wherein the starter motor is capable of generating power using kinetic energy of the engine,
the auxiliary battery is charged by electricity generated by the starter motor, and
in a case where the auxiliary battery is diagnosed as operating abnormally, the controller controls a voltage of electricity generated by the starter motor to a value lower than a value when the auxiliary battery is operating normally.

10. The power supply system according to claim 1, wherein in the abnormality diagnosis, the controller diagnoses whether the auxiliary battery is deteriorated as the abnormality of the auxiliary battery, on a basis of an internal resistance of the auxiliary battery as the state quantity.

11. The power supply system according to claim 1, wherein the controller diagnoses whether there is an abnormality in the auxiliary battery on a basis of a comparison result between the state quantity and a reference value.

12. The power supply system according to claim 11, wherein the controller causes the reference value to change in accordance with a temperature of the auxiliary battery.

13. The power supply system according to claim 1, further comprising a DC-DC converter disposed between the main battery and the auxiliaries, the DC-DC converter being capable of stepping down an voltage of electricity stored in the main battery,
wherein, in the abnormality diagnosis, the controller causes electricity stored in the main battery to be stepped down by the DC-DC converter and supplies the stepped-down electricity to the auxiliaries.

14. The power supply system according to claim 1, further comprising an information device configured to report a diagnostic result of the abnormality diagnosis,
wherein in a case where the auxiliary battery is diagnosed as operating abnormally, the controller causes the information device to report the diagnostic result indicating that the auxiliary battery is abnormally operating.

15. The power supply system according to claim 1,
wherein the controller executes the abnormality diagnosis while the engine is running,
wherein in a case where the auxiliary battery is diagnosed as operating normally, the controller executes an automatic stop control that causes the engine to automatically stop irrespective of an intention of a driver, and
wherein in a case where the auxiliary battery is diagnosed as operating abnormally, the controller prohibits automatic stop control that causes the engine to automatically stop.

16. The power supply system according to claim 1, wherein
the starter motor is capable of generating power using kinetic energy of the engine,
the auxiliary battery is charged by electricity generated by the starter motor, and
in a case where the auxiliary battery is diagnosed as operating abnormally, the controller controls a voltage of electricity generated by the starter motor to a value lower than a value when the auxiliary battery is operating normally.

17. A power supply system comprising:
a driving motor capable of outputting power for driving a driving wheel;
a main battery configured to store electricity to be supplied to the driving motor;
an engine capable of outputting power for driving the driving wheel;
a starter motor configured to start the engine;
an auxiliary battery configured to store electricity to be supplied to the starter motor and auxiliaries;
a DC-DC converter disposed between the main battery and the auxiliaries, the DC-DC converter being capable of stepping down an voltage of electricity stored in the main battery;
a switch disposed between the auxiliary battery and the auxiliaries to make or break an electric coupling between a first group including the auxiliary battery and the starter motor and a second group including the auxiliaries and the main battery, wherein the switch is set to a closed state to make the electric coupling between the first group and the second group, and wherein the switch is set to an open state to break the electric coupling between the first group and the second group; and
circuitry configured to execute an abnormality diagnosis that diagnoses whether there is an abnormality in the auxiliary battery on a basis of an electrical state quantity of the auxiliary battery,
wherein the controller controls the switch to be in the open state prior to executing the abnormality diagnosis such that the switch is in the open state every time the abnormality diagnosis is executed, and
wherein the circuitry controls the switch to be in 1) the open state when a result of the abnormality diagnosis indicates that there is the abnormality in the auxiliary battery and 2) the closed state when the result of the abnormality diagnosis indicates that there is no abnormality in the auxiliary battery.

* * * * *